United States Patent [19]

Courtois et al.

[11] Patent Number: 4,979,168
[45] Date of Patent: Dec. 18, 1990

[54] DYNAMIC SENSING POINT CSMA PACKET SWITCHING CONTROLLER

[75] Inventors: Pierre-Jacques F. Courtois, Rhode; Guy F. J. Scheys, Brussels; Pierre-Nicholaas W. Semal, Lasnes, all of Belgium

[73] Assignee: U.S. Philips Corporation, New York, N.Y.

[21] Appl. No.: 265,363

[22] Filed: Oct. 28, 1988

[30] Foreign Application Priority Data

Oct. 30, 1987 [GB] United Kingdom ............... 8725487

[51] Int. Cl.$^5$ ............................................. H04J 3/16
[52] U.S. Cl. ................................ 370/95.1; 370/85.3; 370/94.1
[58] Field of Search ....................... 370/85, 94, 95, 86, 370/85.7, 95.1, 95.3, 85.3; 340/825.5

[56] References Cited

U.S. PATENT DOCUMENTS

| | | | |
|---|---|---|---|
| 4,581,734 | 4/1986 | Olson et al. | 370/85 |
| 4,630,264 | 12/1986 | Wah et al. | 370/85 |
| 4,701,909 | 10/1987 | Kavehrad et al. | 370/85 |
| 4,707,832 | 11/1987 | Glenn et al. | 370/85 |

OTHER PUBLICATIONS

M. S. Hazell et al., "A Fully Distributed Approach to the Design . . . ", IEEE Milcom '83, pp. 645–649.
L. Kleinrock, "Packet Switching in Radio Channels: Part I . . . ", IEEE Trans. on Comm., vol. COM-23, No. 12, 1975.

*Primary Examiner*—Douglas W. Olms
*Assistant Examiner*—Min Jung
*Attorney, Agent, or Firm*—Anne E. Barschall

[57] ABSTRACT

A controlled CSMA packet switching system of a non-persistent carrier type in which in the event of a channel being sensed busy, a new sensing point is scheduled at random in a dynamically determined time interval $TS_n$ where $$TS_n = \min\left( TS_u, \max\left( TS_1, TS_{n-1} \cdot \frac{G_{n-1}}{G_o} \right)\right)$$

where $TS_u$ is the scheduling time interval that maximizes the expected throughput when all the stations compete for the channel access, $TS_1$ is the scheduling time interval that maximizes the expected throughput when two stations complete for the channel access, $TS_{n-1}$ is a scheduling time interval determined in a preceding $(n-1)$th observation interval, $G_{n-1}$ is the average offered load in the $(n-1)$th observation interval, and $G_o$ is a nominal average offered load. An estimation of the average offered load $G_{n-1}$ is derived from an estimation of the average idle period length in the $(n-1)$ observation interval. Three strategies for obtaining such an estimation when a station participates to at least one transmission in the observation interval are disclosed.

35 Claims, 4 Drawing Sheets

| n | Probability (a = .15) |
|---|---|
| 1 | 0.59652941 |
| 2 | 0.70003313 |
| 3 | 0.77154413 |
| 4 | 0.82339288 |
| 5 | 0.86205477 |
| 6 | 0.89142026 |
| 7 | 0.91401912 |
| 8 | 0.93158258 |
| 9 | 0.94533801 |
| 10 | 0.95617802 |
| 12 | 0.97159495 |
| 14 | 0.98141771 |
| 16 | 0.98775323 |
| 18 | 0.99187895 |
| 20 | 0.99458666 |
| 25 | 0.99799960 |
| 30 | 0.99924534 |
| 35 | 0.99971076 |
| 40 | 0.99988775 |
| 45 | 0.99995599 |
| 50 | 0.99998260 |
| 60 | 0.99999723 |
| 70 | 0.99999955 |
| 80 | 0.99999993 |
| 90 | 0.99999999 |
| 100 | 1.00000000 |
| 150 | 1.00000000 |
| 200 | 1.00000000 |
| 250 | 1.00000000 |

FIG. 3

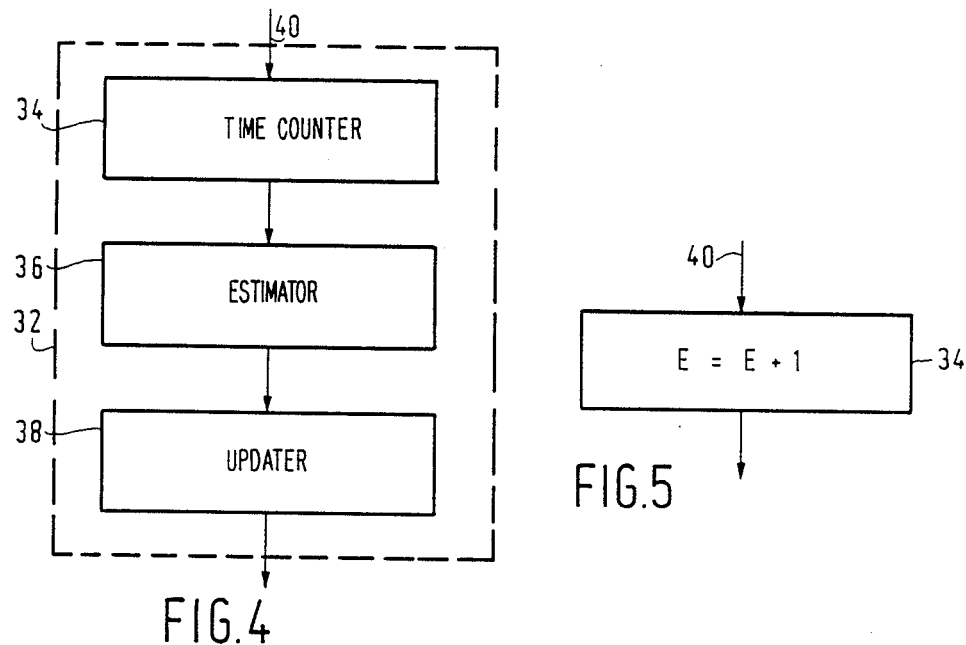
FIG.4
FIG.5
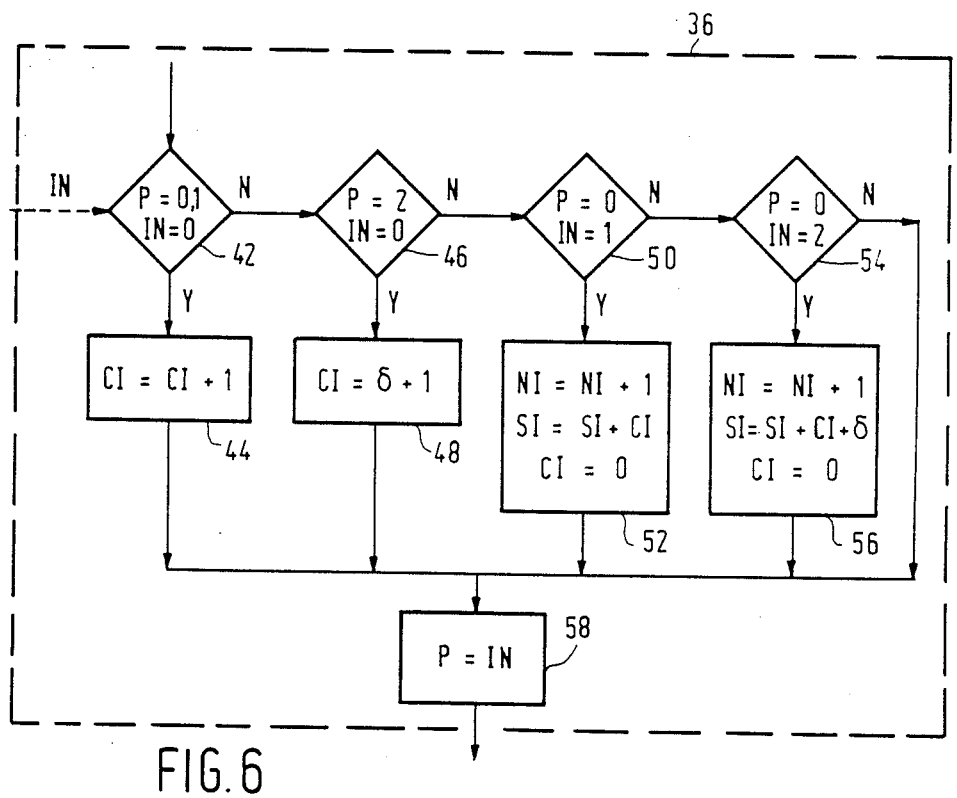
FIG.6

DYNAMIC SENSING POINT CSMA PACKET SWITCHING CONTROLLER

BACKGROUND OF THE INVENTION

The present invention relates to a controlled CSMA packet switching system in which information packets are multiplexed according to a "Carrier Sense Multiple Access" (CSMA) protocol, particularly a non-persistent CSMA protocol.

The present invention also relates to a method of operating such a controlled CSMA packet switching system and to a station for use therein.

An article "Packet Switching in Radio Channels: Part 1—Carrier Sense Multiple—Access Modes and Their Throughput—Delay Characteristics" by L. Kleinrock and F. A. Tobagi in IEEE Transactions on Communications, Vol. COM-23, No. 12, Dec. 1975 pages 1400 to 1416 discloses two CSMA protocols and compares them to random ALOHA access modes. The two CSMA protocols disclosed are non-persistent CSMA and p-persistent CSMA. Simply stated CSMA is a technique in which the likelihood of collisions between information packets transmitted substantially simultaneously by two or more stations is reduced by first listening to (or sensing) the signalling channel for the carrier due to another user's transmission. Variations within the CSMA technique centre around the action that a user takes after sensing the channel.

With the non-persistent CSMA protocol a station which has an information packet ready for transmission operates as follows:

(1) If the channel is sensed idle, it transmits the packet.

(2) If the channel is sensed busy, then the station reschedules the retransmission of the packet to some later time according to the sensing delay distribution. At this new point in time, it senses the channel and repeats the algorithm described.

A maximum throughput of one may not be achieved when using the non-persistent CSMA protocol due to the fact that each station takes a finite time, a, to switch from the receive mode to the transmit mode and, during this time interval, another station which senses the channel finds it idle and also prepares for the transmission of its own information packet. The time interval a is frequently termed the vulnerability period.

With the p-persistent CSMA protocol, a station which is ready for transmission operates as follows:

(1) If the channel is sensed idle, it transmits the packet with probability p. If it refrains from transmitting, then it waits for a time interval equal to the vulnerability period a and senses the channel again. If at this new point in time, the channel is still detected idle, it repeats the procedure described. Otherwise, the station reschedules the transmission of the packet to some later time according to the resensing delay distribution.

(2) If the channel is sensed busy, it waits until the channel goes idle and then operates as above.

In non-persistent CSMA the dynamic determination of an adequate retransmission delay distribution requires amongst other things details of the average load offered to the channel. Since the average load offered to the channel consists of sensings only, it cannot be measured. However, the effective packet traffic on the channel is directly related to the sensing rate. A measure of this traffic can therefore provide an estimation of the average offered load in terms of number of sensings.

In an article "Packet Switching in a Multiaccess Broadcast Channel: Dynamic Control Procedures", IEEE Transactions on Communications, Vol. COM-23, No. 9 Sept. 1975 pages 890 to 904, L. Kleinrock and S. Lam propose to control the average load G offered to a channel accessed according to the slotted ALOHA protocol by means of the measure of the idle slot probability $p_o$. With this protocol, the time axis is divided into slots that are equal to the packet transmission time and a station which has an information packet ready for transmission waits for the commencement of the next slot and then transmits the packet. The implementation of a similar strategy for a non-persistent CSMA protocol is much more difficult. First, the evaluation of the probability of the channel being idle requires the estimation of the average length of busy and idle periods. Secondly, no formula allows G to be directly derived from $p_o$.

M. S. Hazell and B. H. Davies, in an article "A Fully Distributed Approach to the Design of a 16K bits/sec VHF Packet Radio Network", Proceedings of IEEE MILCOM '83, Washington, 1983 pages 645 to 649, propose to derive an estimation of the average offered load G from a measure of the clash ratio, that is from a measure of the percentage of transmissions which are unsuccessful due to two or more information packets being transmitted substantially simultaneously. Whilst this article illustrates the viability of this method, it is felt that a further improvement in the throughput of information packets can be realized by another approach which does not rely on the measure of the clash ratio which in any event has the disadvantage of presenting too large a standard deviation.

SUMMARY OF THE INVENTION

According to one aspect of the present invention there is provided a controlled carrier sense multiple access (CSMA) packet switching system, comprising at least two stations, each of the stations having means to sense a communications channel when it wants to transmit an information packet and means responsive to the channel being sensed idle for transmitting the information packet, wherein in the event of the channel being sensed busy, a new sensing point is scheduled at random in a dynamically determined time interval $TS_n$ where $$TS_n = \min\left(TS_u, \max\left(TS_1, TS_{n-1} \cdot \frac{G_{n-1}}{G_o}\right)\right)$$

where $TS_u$ is the scheduling time interval that maximises the expected throughput when all the stations compete for the channel access, $TS_1$ is the scheduling time interval that maximises the expected throughput when two stations compete for the channel access, $TS_{n-1}$ is a scheduling time interval determined in a preceding (n−1)th observation interval, $G_{n-1}$ is the average offered load in the (n−1)th observation interval, and $G_o$ is a nominal average offered load.

An estimation of the average offered load $G_{n-1}$ in the (n−1)th interval is in an embodiment of the present invention derived from an estimation of the average idle period length, where $G_{n-1} = (\overline{E[I(I)]} - a)^{-1}$, where $\overline{E[I(I)]}$ is the estimator of the average idle period and a is the switching time of a station. It is considered that optimal control can be maintained if an estimation of the average idle period length is available.

For optimal control, a value $G_o$ of the average offered load which maximizes the expected channel throughput is determined and the scheduling time interval $TS_n$ is aimed at maintaining the average load offered to the channel to the nominal value of $G_o$.

The average idle period length may be estimated by averaging the lengths of the idle periods occurring during an observation period, that is the estimator of the average idle period $\overline{E[l(I)]} = SI/NI$ where SI is the current sum of the lengths of the idle periods and NI is the number of idle periods.

Each station may include estimating means for estimating the average idle period in the event of the station participating in a busy period not being able to detect the end of the preceding idle period and the beginning of the following idle period.

In one embodiment of the present invention the estimating means discards from its current estimation the idle periods which border the busy period in which its station is transmitting and bases its estimation on only fully observed idle periods.

In a second embodiment of the present invention the estimating means integrates into its estimation an approximation of the combined length in the time domain of the idle periods immediately preceding and following the busy period in which the station transmits, said approximation being based on determining the commencement ($t^b(I_m)$) of the preceding idle period and the termination ($t^e(I_{m+1})$) of the next following idle period and upper bounding the length of the intervening busy period by $(1+a)$ and subtracting $t^b(I_m)$ and $(1+a)$ from $t^e(I_{m+1})$.

In a third embodiment of the present invention the estimating means integrates into its estimation an approximation of the combined length in the time domain of the idle periods immediately preceding and following the busy period in which the station transmits, said approximation being based on determining the commencement ($t^b(I_m)$) of the preceding idle period and the termination ($t^e(I_{m+1})$) of the next following idle period and estimating the length of the intervening busy period $E[l(B)_m]$ in which the station transmits and subtracting $t^b(I_m)$ and $E[l(B)_m]$ from $t^e(I_{m+1})$.

In a fourth embodiment of the present invention the estimating means integrates into its estimation an approximation of the length of the preceding idle period by estimating the end of the preceding idle period and subtracting the time of occurrence of the preceding idle period, and an approximation of the length of the immediately following idle period by subtracting an estimation of the beginning of the immediately following idle period from the time of occurrence of the end of the following time period.

An advantage of the fourth embodiment over the third embodiment is that all stations (transmitting or receiving) are anteed to have an estimation of the average idle period length if at least one complete idle period occurred in the observation interval. This is not the case with the third embodiment particularly when the station participates to two or more busy periods in succession. In the third embodiment, a station has to wait until it has observed the end of an idle period, that is, the beginning of a busy period to which it does not participate, before it can make its approximations of the intervening idle periods. This is not the case with the fourth embodiment.

The estimating means of the fourth embodiment estimates the end of the preceding idle period as being later by $\delta$ seconds than the instant ($t_2$) when the station having a packet for transmission found the channel idle, that is at time $t_2 + \delta$, where $\delta$ contains the idle period correction and equals $$\delta = \frac{a + \frac{1}{G}(1 - e^{-aG})}{2}$$

where a is the receive to transmit switching time of the station and G is the load offered to the channel. The beginning of the next following period is estimated as being $t_2 + 2a - \delta$ where 1 is the transmission time of an information packet (unity of time).

The size of the observation interval should not be so long as to present too large a standard deviation but at the same time the number of idle periods sensed should be such at $G_{n-1}$ can be estimated with a high degree of confidence. In the fourth embodiment of the invention the observation period is determined dynamically on the basis of $$U = max\ (2 \times TS; U_1)$$

where TS is the current control variable.

The present invention also relates to a method of operating a controlled CSMA packet switching system of a non-persistent type, the system comprising at least two stations operating on at least one communication channel, wherein in the event of a station sensing that the or each channel is busy, a new sensing point is scheduled at random by the station in a dynamically determined time interval $TS_n$ where $$TS_n = min\left(TS_u, max\left(TS_1, TS_{n-1} \cdot \frac{G_{n-1}}{G_o}\right)\right)$$

where $TS_u$ is the scheduling time interval that maximises the expected throughput when all the stations compete for channel access, $TS_1$ is the scheduling time interval that maximises the expected throughput when two stations compete for the channel access, $TS_{n-1}$ is a scheduling time interval determined in a preceeding (n−1)th observation interval, $G_{n-1}$ is the average offered load in the (n−1)th observation interval and $G_o$ is a nominal average offered load.

The present invention also relates to a station for use in a non-persistent controlled CSMA packet switching system, comprising a receiver, a transmitter, switching means to switch either the receiver or the transmitter to a communications channel, said receiver having sensing means to sense the busy/idle state of the communication channel and to actuate the switching means to switch from the receiver to the transmitter in the event of the station having an information packet ready for transmission and the channel being sensed idle, wherein in the event of the station having an information packet ready for transmission and the channel is sensed busy, a new sensing point is scheduled at random in a dynamically determined time interval $TS_n$ where $$TS_n = min\left(TS_u, max\left(TS_1, TS_{n-1} \cdot \frac{G_{n-1}}{G_o}\right)\right)$$

where $TS_u$ is the scheduling time interval that maximises the expected throughput when all the stations compete for channel access, $TS_l$ is the scheduling time interval that maximises the expected throughput when two stations compete for the channel access, $TS_{n-1}$ is a scheduling time interval determined in a preceding (n−1)th observation interval, $G_{n-1}$ is the average offered load in the (n−1)th observation interval and $G_o$ is a nominal average offered load.

The present invention will now be described, by way of example, with reference to the accompanying drawings, wherein:

FIG. 1 is an illustration of a CSMA packet switching system comprising four stations which communicate via a single radio channel, FIG. 2 illustrates an example of behaviour patterns on the radio channel, FIG. 3 is a tabular summary of the number n of idle periods which have been observed versus the probability that a throughput of at least ninety percent of the maximum possible throughput will be achieved during the next period for a vulnerability period a=0.15, and FIGS. 4 to 7 comprise a block schematic diagram of a channel controller and flow charts associated with aspects of its operation.

DESCRIPTION OF EMBODIMENTS

Figure 1:
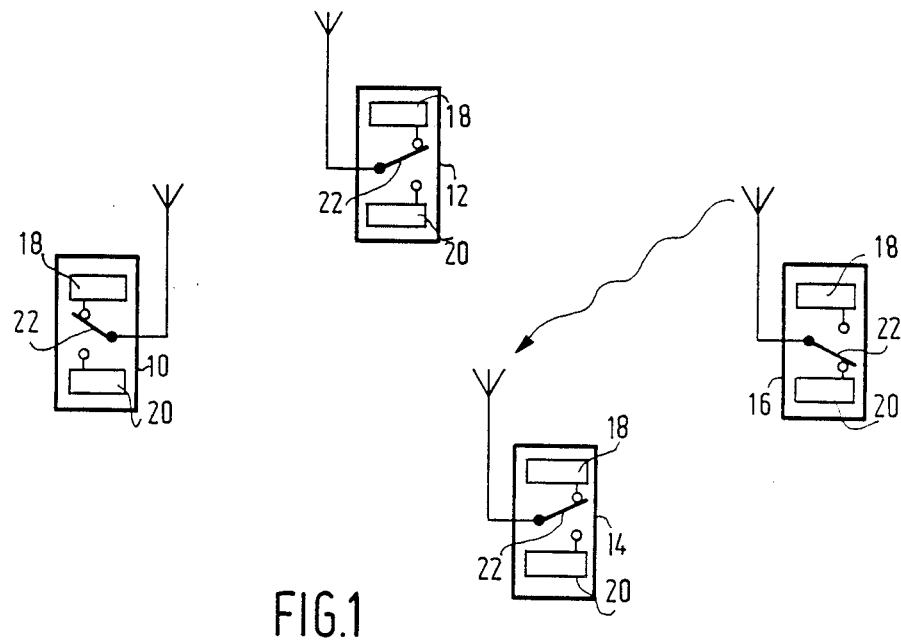

In the drawings the same reference numerals are used to indicate corresponding parts.

The CSMA packet switching system shown in FIG. 1 comprises four stations 10, 12, 14, 16 which are capable of communicating with each other by way of a single channel radio link. Each station comprises a transceiver formed by a receiver 18 and a transmitter 20. Each of the stations 10 to 16 includes a source of information (not shown), such as a computer, which from time to time wishes to relay information to say another computer at another station. The information is transmitted in packets which are of a constant or variable length. When a station, such as station 16 wishes to transmit a packet of information to say the station 14, its receiver listens to the channel and if it is idle, a switch 22 changes over from the receive mode to the transmit mode and sends the information packet. However, if the channel is busy or the information packet is corrupted by collision with another information packet being transmitted substantially simultaneously then the station is said to be backlogged and under the non-persistent CSMA protocol another attempt is made at some later time according to a sensing delay distribution. As mentioned in the preamble, collision between information packets can occur by a second station listening to the radio channel and finding it idle during the time period, termed the vulnerability period, when a first station is switching from receive to transmit. It should be mentioned that this CSMA can be applied to other forms of communication channels such as wires and optical fibres. Additionally the protocol can be adapted for two or more communication channels.

Figure 2:
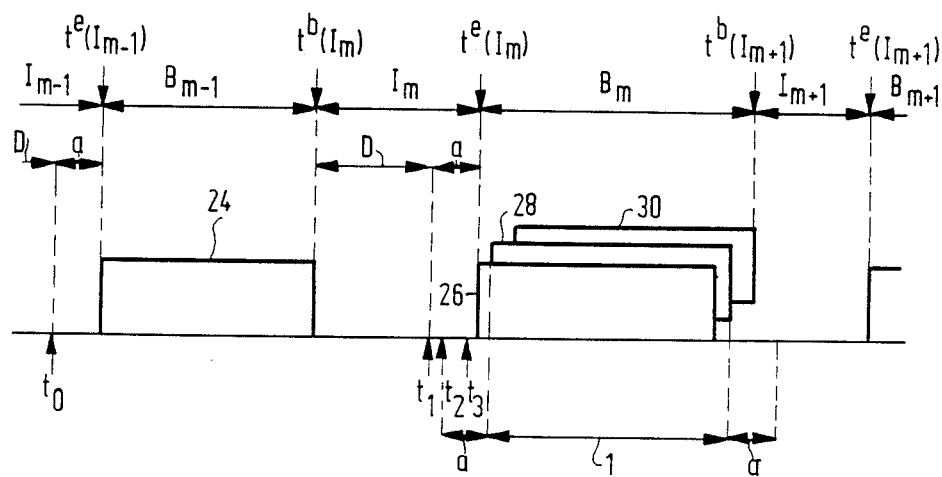

FIG. 2 illustrates various conditions which can occur on the signalling channel in the time domain. The signalling channel comprises alternate busy (B) and idle (I) periods. Commencing at the left hand side of FIG. 2, an idle period $I_{m-1}$ prevails and at an arbitrary time $t_o$ a station, say the station 10, wishes to transmit an information packet, and it listens to the channel to see if a carrier transmitted by another station is present. Finding the channel idle it switches from receive to transmit and at time $t^e(I_{m-1})$ it sends the information packet 24. This information packet 24 may be a newly generated packet in which case the sensing of the channel and the immediate transmission of the packet is termed Immediate First Transmission (IFT) or it may have been a backlogged information packet which due to the channel being busy or to a collision of packets on the channel was not transmitted or successfully transmitted at the time it was generated. The transmission of the packet 24 terminated at time $t^b(I_m)$ and the busy period $B_{m-1}$ has a length $[t^b(I_m)-t^e(I_{m-1})]$. An idle period $I_m$ follows this busy period. After a time elapse D, a station, say the station 12, wants to transmit an information packet so that at a time $t_1$ it senses the channel and on finding it idle, the station switches from receive to transmit which operation takes a seconds, a being less than the length of a typical information packet which will be taken as unity, that is 1. At time $t^e(I_m)$, the station 12 commences its transmission of a packet 26 and the busy period $B_m$ begins. During the interval a, the switching time of the station 12 for example, two other stations, say stations 14 and 16, want to transmit packets and sense the channel at $t_2$ and $t_3$, respectively. Finding it idle, the stations 14 and 16 switch from receive to transmit and send their respective packets 28 and 30. As the packets 26, 28 and 30 are simultaneously present on the channel then they collide and the information is corrupted. The busy period $B_m$ terminates at time $t^b(I_{m+1})=t_3+a+1$, when the station 16 has completed the transmission of the packet 30.

In accordance with the non-persistent controlled CSMA protocol the packets 26, 28, 30 are backlogged at their respective stions 12, 14, 16 and try to send them later by first sensing the channel at an instant $t+\tau$ scheduled by the respective station. $\tau$ is a random variable uniformly drawn in a time interval (O, TS) which is called the scheduling time interval (STI). The scheduling adopted by the stations 10, 12, 14 and 16 is determined to maximise the successful use of the channel. Thus under light traffic conditions the time interval TS is relatively short whilst under heavy traffic conditions TS is relatively long. Thus by tuning TS, the stations can control the load G (in terms of sensings per unit time) offered to the channel. In order to tune TS account has to be taken of the receive to transmit time a, the packet length (or its distribution if it is not fixed) and the desired system performance so that a nominal load $G_o$ (optimal) can be defined.

In accordance with the present invention the value of $TS_n$ which is aimed at obtaining the nominal load $G_o$ for the next time interval is given by:

$$TS_n = TS_{n-1} \frac{G_{n-1}}{G_o} \quad (1)$$

where $TS_{n-1}$ was used for the STI length during the last observation interval (the (n−1)th observation interval) and $G_{n-1}$ is the average load measured during the same interval.

If, for stability reasons, a smoothing factor $\alpha$ has to be used then equation (1) becomes $$TS_n = (1 - \alpha) \times TS_{n-1} + \alpha \times TS_{n-1} \frac{G_{n-1}}{G_o} \quad (2)$$

For reasons of stability the value of TS is not updated after every busy period $B_m$ but after observing the channel for an interval U which is equivalent to a plurality of busy and idle periods. The observation interval U also corresponds to the time interval between two successive updates of the control variable TS.

Equations (1) and (2) have relied on two assumptions: firstly the traffic is assumed to be essentially composed of sensings generated by backlogged stations (the first sensing induced by a newly generated packet is neglected) and, secondly, the number b of the stations that were backlogged during the last observation interval will remain approximately the same for the next interval. With these assumptions, the expression (1) simply asserts that if b stations working with $TS_{n-1}$ have generated an average load $G_{n-1}$ during the last observation interval U, then, the same b stations working with $TS_n$ will generate an average load $G_o$.

The implementation of the update (1) or (2) requires thus an estimation $G_{n-1}$ of the average load offered during the last observation interval. Since this average load consists of sensings only, it cannot be measured. However, the effective packet traffic on the channel is directly related to the sensing rate. A measure of this traffic can therefore provide an estimation of the average offered load in terms of number of sensings.

The system in accordance with the present invention is based on an estimation of the average idle period length. The channel time behaviour is an alternating sequence of busy (B) and idle (I) periods (see FIG. 2). The length $l(I_m)$ of an idle period $I_m$ is the time D elapsed between the end of a transmission $t^b(I_m)$ (which is an arbitrary time instant) and the first next sensing time $t_1$ (which will of course lead to a transmission since the channel is idle) plus the receive to transmit switching time a:

$$l(I_m) = t^e(I_m) - t^b(I_m) \qquad (3)$$
$$= t^e(I_m) - t_1 + t_1 - t^b(I_m)$$
$$= a + D.$$

On the average, D is the time an independent observer who arrives at a random time has to wait until the first sensing. Since the arrival process of the sensings can be assumed to be Poisson distributed with mean $G_{n-1}$, this time D is, on the average, equal to the mean interarrival time $$\frac{1}{G_{n-1}}.$$

We have thus $$\overline{E[l(I)]} = a + \frac{1}{G_{n-1}} \qquad (4)$$

$$G_{n-1} = (\overline{E[l(I)]} - a)^{-1}. \qquad (5)$$

An optimal control can thus be implemented if an estimation of the average idle period length is available. Such an estimation is provided by averaging the lengths of the idle periods occurring during an observation interval U. Practically, the estimation process consists in the update of two variables SI and NI which respectively contain the current sum of the lengths of the idle periods that have been observed and their number:

$$SI = SI + l(I_m); \qquad (6)$$

$$NI = NI + 1;$$

When the control variable has to be updated, the estimation of the average idle period length is obtained by $$\overline{E[l(I)]} = SI/NI; \qquad (7)$$

and the variables SI and NI are rest to zero.

A station must thus be able to detect, at least approximately, the beginning and the end of each idle period. This does not raise problems for a station which remains in the receiving state, i.e. which never switches to the transmitting mode during a whole observation interval.

On the other hand, a station which participates to a busy period $B_m$ is not able to detect the end $t^e(I_m)$ and the beginning $t^b(I_{m+1})$ of the idle periods before and after $B_m$. Indeed, assume that this station has scheduled a sensing point at time $t_2$ and that the channel has been sensed idle at that time (see FIG. 2). Then, that station will switch to the transmitting mode (a mode that will be reached at time $t_2+a$), will transmit its packet during time interval $[t_2+a, t_2+a+1]$ and will switch back to the receiving mode (reached at time $t_2+2a+1$). A transmitting station is thus unable to observe the channel during a period of length $2a+1$, called the transmission blind period. By being unable to observe the times $t^e(I_m)$ and the $t^b(I_{m+1})$ which fall within such a transmission blind period, this station cannot integrate automatically and accurately the lengths $l(I_m)$ and $l(I_{m+1})$ in its estimation (6) of the average idle period length. Three different strategies can be followed to cope with this problem.

In accordance with a first of the three strategies a station can simply discard, from its current estimation, the idle periods $I_m$ and $I_{m+1}$ that border the busy period during which it is transmitting. This means that only the lengths of idle periods that can be fully observed are taken into account in the estimation process (7) of $\overline{E[l(I)]}$. This strategy can be implemented fairly easily but will only be acceptable if those idle periods that are fully observable are sufficiently numerous to obtain a reasonable estimation of their average length. Indeed, this strategy neglects the parts of $I_m$ and of $I_{m+1}$ that have been effectively observed, i.e. the lengths of the intervals $$[t^b(I_m), t_2] \text{ and } [t_2+1+2a, t^e(I_{m+1})]. \qquad (8)$$

Furthermore, no information at all would remain available to estimate $\overline{E[l(I)]}$, if a station participates to every other busy period.

A variant of the first strategy consists in integrating into the estimation of $\overline{E[l(I)]}$ an approximation (denoted by the line over the item) of the combined length of the idle periods $I_m$ and $I_{m+1}$:

$$SI = SI + \overline{l(I_m) + l(I_{m+1})}; \qquad (9)$$

$$NI = NI + 2;$$

Since the times $t^b(I_m)$ and $t^e(I_{m+1})$ can be observed by a transmitting station, the sum of the lengths of these two idle periods is given by $$l(I_m) + l(I_{m+1}) = t^e(I_{m+1}) - t^b(I_m) - l(B_m), \qquad (10)$$

where $l(B_m)$ is the length of the busy period $B_m$. This cumulated sum can be decomposed as $$l(I_m) + l(I_{m+1}) = t^e(I_{m+1}) - (t_2 + 1 + 2a) + \qquad (11)$$
$$(1 + 2a) - l(B_m) + t_2 - t^b(I_m),$$

which shows that the parts (8) of the idle periods that have been effectively observed are taken into account. However, the quantity $l(B_m)$ is, of course, not available to that transmitting station and must be bounded or approximated. By definition, this length ranges from 1 (if the packet is alone and successfully transmitted) up to $1+a$ (since a is the largest time interval that can separate any two sensings that lead to a transmission in the same busy period)

$$1 \leq l(B_m) \leq 1 + a. \qquad (12)$$

If the upper bound $1+a$ is used, then, the total length (10) is understimated and so will be $E[l(I)]$. By (5) the average load $G_{n-1}$ will be overestimated and this will lead to some performance degradations. Fortunately, this degradation is in the direction of higher stability since the control procedure will aim at an average offered load which is smaller than the optimal one. Such a degradation could be partially avoided by using an expected value of $l(B_m)$ instead of an upper bound:

$$\overline{E[l(B)]} = 1 + G \int_0^a t e^{G(a-t)} dt = 1 + a - \frac{1}{G}(1 - e^{-aG}). \qquad (13)$$

A second of the three strategies has been developed from equation (9) using one of the following approximations:

$$t^e(I_{m+1}) - t^b(I_m) - (1 + a), \qquad (14)$$
$$\overline{l(I_m) + l(I_{m+1})} = \text{or, } t^e(I_{m+1}) - t^b(I_m) - \overline{E[l(B)]}.$$

For convenience, the second approximation, $\overline{E[l(B)]}$, of the busy period length will be used in the remainder of the specific description. Compared to the first strategy, this second strategy takes into account the information that is available on the lengths of $I_m$ and of $I_{m+1}$ (the part of the idle period that has been effectively observed) but introduces an error $\Sigma$ which is at most $a/2$ when the upper bound is used and which is smaller when the expected value (13) is used. When a station participates to k successive busy periods, the approximation of the total length of the (k+1) consecutive idle periods will be integrated into the estimation of $\overline{E[l(I)]}$:

$$SI = SI + \overline{\sum_{j=m}^{j=m+k} l(I_j)}; \qquad (15)$$
$$NI = NI + k + 1;$$

where, $$\overline{\sum_{j=m}^{j=m+k} l(I_j)} = t^e(I_{m+k+1}) - t^b(I_m) - k \times \overline{E[l(B)]}. \qquad (16)$$

This strategy implicity takes into account the (k+1) idle period parts which have been effectively measured but requires the observation of the time $t^e(I_{m+k+1})$ before they can be integrated. This means that if $I_{m-1}$ belonged to the previous observation interval, then no TS update can be performed before the end of an idle period $t^e(I_{m+k+1})$ is effectively observed because no estimation will be available before that time.

A third of the three strategies tries to cope with this drawback of the second strategy by approximating the length of every incompletely observed idle period independently:

$$SI = SI + \overline{l(I_m)}; \qquad (17)$$
$$NI = NI + 1;$$

In the second strategy, the length of a busy period $l(B_m)$ to which a station participates can be approximated. The station can then assume that this busy period is centered on its own transmission. This means that if its transmission blind period is $[t_2, t_2+2a+1]$, the station will approximate the end of the preceding idle period as $$\overline{t^e(I_m)} = t_2 + \delta \qquad (18)$$

and the beginning of the next idle period as $$\overline{t^b(I_{m+1})} = t_2 + 1 + 2a - \delta, \qquad (19)$$

where $$\delta = \frac{a + \frac{1}{G}(1 - e^{-aG})}{2} \qquad (20)$$

Practically, the station which switches from the receive mode to the transmission mode performs a correction $\delta$ on the current idle period length:

$$\overline{l(I_m)} = \overline{t^e(I_m)} - t^b(I_m) = t_2 - t^b(I_m) + \delta. \qquad (21)$$

Conversely, the same correction $\delta$ is made on the next idle period $I_{m+1}$:

$$\overline{l(I_{m+1})} = t^e(I_{m+1}) - \overline{t^b(I_{m+1})} = t^b(I_{m+1}) - (t_2 + 1 + 2a) + \delta \qquad (22)$$

If the station can observe the end of the idle period $I_{m+1}$, (i.e. if it does not participate to the $(m+1)^{th}$ busy period), then no difference between the second and third strategy remains. Indeed, using the equations (21) and (22), the sum of the lengths of the two last idle periods is $$\overline{l(I_m)} + \overline{l(I_{m+1})} = t^e(I_{m+1}) - t^b(I_m) - (\overline{t^b(I_{m+1})} - \overline{t^e(I_m)}) \qquad (23)$$
$$= t^e(I_{m+1}) - t^b(I_m) - [1 + 2a + 2\delta]$$
$$= \overline{l(I_m) + l(I_{m+1})}.$$

This third strategy will thus behave like the second strategy except when the station participates to two or more (k) busy periods in succession. Under the second strategy, the station should have waited until it has observed the end of an idle period $t^e(I_{m+k+1})$, i.e. the beginning of a busy period to which it does not participate. With the third strategy, all stations (transmitting or receiving) are now guaranteed to have an estimation of the average idle period length if at least one complete idle period occured in the observation interval.

A drawback of the updates of the control variable TS defined by equations (1) and (2) is that Ts may assume any nonnegative value. This implies for example that TS will be set equal to zero if the channel is totally silent during one estimation period. However the control variable is only used to schedule sensing times when there exists some contention for the channel access. It is therefore required that TS always remains larger or equal to the value $TS_1$ that maximises the expected channel throughput when there are only two users competing for the channel access. Similarly, the value of TS should never be larger than the value $TS_u$ which maximises the throughput when all the stations compete for the access of the channel. The update of TS will thus be performed according to $$TS_n = \min\left(TS_u, \max\left(TS_1, TS_{n-1} \cdot \frac{G_{n-1}}{G_o}\right)\right) \quad (24)$$

or $$TS_n = \min(TS_u, \max(TS_1, (1-\alpha) \times TS_{n-1} + \alpha \times \quad (25)$$

$$TS_{n-1}\frac{G_{n-1}}{G_o}$$

The updates of the control variable TS in equations (24) and (25) require the estimation of the average load offered to the channel since the last TS update. The observation interval, say of length U, may thus only start at this time. By starting the observation interval at that last update time then U will also denote the time interval between two successive updates of the control variable TS.

The distributed strategy described above allows every station dynamically to estimate G on the basis (see (5)) of an estimation of the average idle period length. In order to avoid a situation in which this estimator presents a too large standard deviation, a lower bound $U_1$ on the observation interval length must be imposed. This minimal length must ensure that a minimal number of idle periods are observed between successive updates in order that G can be estimated with a high degree of confidence.

In the system made in accordance with the present invention, the choice of the $U_1$ value results from the following considerations. For a given vulnerability period a, the expected throughput S of a CSMA channel is given by $$S(a,G) = \frac{Ge^{-aG}}{G(1+2a)+e^{-aG}} \quad (26)$$

By setting the derivative of (26) to zero, the sensing rate $G_o(a)$ that maximises S may be easily found and the interval of sensing rates which lead to at least ninety percent of the maximum possible throughput can be easily determined. This interval $[\alpha_1(a), \alpha_2(a)]$, which satisfies $$\forall \alpha \epsilon [\alpha_1(a),\alpha_2(a)]:S(a,\alpha G_o(a)) > 0.9 S(a,G_o(a)), \quad (27)$$

is called the ninety percent throughput interval.

If instead of the exact value of G, an erroneous average sensing rate $\overline{G}=G/\alpha$ has been obtained from the measurement procedure, then the update (see (1)) of the control variable TS is such that an average sensing rate of $\alpha G_o(a)$ will prevail for the next period. Any $\alpha$ value within the ninety percent throughput interval is thus satisfactory and the measurement procedure needs not to be more accurate than what is required to guarantee with a high level of confidence that G is always within the interval $$[\alpha_1(a)\overline{G},\alpha_2(a)\overline{G}]. \quad (28)$$

By means of a Bayesian analysis it can be shown that the probability that the exact average sensing rate G lies in the interval (28) is approximated by $$\text{Prob}[(\alpha_1(a)\overline{G}) \leq G \leq (\alpha_2(a)\overline{G})] \simeq \quad (29)$$

$$e^{-(n+1)\alpha_1(a)} \sum_{k=0}^{n} \frac{[(n+1)\alpha_1(a)]}{k!} -$$

$$e^{-(n+1)\alpha_2(a)} \sum_{k=0}^{n} \frac{[(n+1)\alpha_2(a)]}{k!}$$

f the estimator $\overline{G}$ of the expected sensing rate G is equal to $$\overline{G} = \left(\frac{s}{n} - a\right)^{-1} \quad (30)$$

where n is the number of idle periods which have been observed and s their cumulated length. Equation (29) is used to derive the minimal number $n_m(a)$ of idle periods to be observed to guarantee with a high level of confidence that G lies in the interval (28). FIG. 3 gives a tabular summary of the values of this probability for different values of n and a vulnerability period a=0.15, for which $\alpha_1(a)=0.5208$ and $\alpha_2(a)=1.8090$. From this table, it can be deduced that the observation of 18 idle periods is sufficient to guarantee that G lies in the ninety percent throughput interval with 99 percent probability.

As the average cycle length (idle plus busy period) is upper bounded by $$1 + 2a + \frac{1}{G_o(a)}, \quad (31)$$

the minimal length $U_1$ of the observation interval is chosen as $$U_1 = n_m(a)\left(1 + 2a + \frac{1}{G_o(a)}\right). \quad (32)$$

The use of a minimal size on the observation interval length also results from the delay existing between the moment the control variable is updated and the moment the new value becomes effective. If, for example, a station senses the channel at time t and finds it busy, then it will schedule a next sensing for time $t+\theta$ by using the current TS value. This TS value remains effective up to time $t+\theta$ even though a TS update may occur before, at time $t+\eta, \eta<\theta$, for instance. The measurements in $[t+\eta, t+\theta]$ will thus include data which are still related to the previous (and already updated) TS value. Since the sensings of a station are on the average separated by TS/2 time units, the $[t+\eta, t+\theta]$ time interval has an average length of TS/4. The TS/4 first time units of an observation interval are thus still related to the previous TS value. This shows that if a too small observation interval is used ($U \leq TS/4$), the effect of the last control variable update could not be observed.

These two arguments act in favour of a large observation interval U. On the other hand, the updates must also be as frequent as possible to respond to the dynamic behaviour of the system. The following compromise has been found to provide an estimate of $G_{n-1}$ with a high degree of confidence $$U = \max(2TS, U_1); \quad (33)$$

$$U_1 = n_m(a) \cdot \left(1 + 2a + \frac{1}{G_0(a)}\right)$$

For large TS values, the proportionality to TS guarantees that the estimation process will take the last TS update into account and for small TS values, $U_1$ guarantees that the observation interval is sufficiently long to provide an accurate estimation of the average idle period length.

A useful feature of this strategy is that it forces the greedy stations that is those that have small TS values to update more frequently their TS value. If the average offered load has to be reduced, most of the greedy stations will have to reduce their contribution (by increasing their TS value) and this will lead to some uniformity of the TS values. On the other hand, if the average offered load has to be increased, this strategy will correspond to some priority scheme. The stations with small TS values will reduce their control variable more often so that they implicity get a higher priority. These stations will most likely be the first to leave the backlog and after their departure, the stations with the smallest TS values will in their turn increase their contribution to the average offered load and so on. Thus the stations are not on equal footing as long as the backlog is not empty. A sort of ordering is introduced with the possible beneficial effect of restraining the number of collisions. This ordering of course vanishes as soon as the system becomes empty since all the stations reach then their minimal TS value.

The operation of a station will now be described with reference to FIGS. 4 to 7 which are a block schematic diagram of a channel controller and flow charts for implementing the third strategy for estimating the average idle period length E[l(I)]. Definitions for the variables used are as follows:

Control Parameter:
TS: contains the length (in clock pulses) of the scheduling time interval (STI)

Input Signal:

IN = 0 when the station is in its receiving mode and the channel is idle,
= 1 when the station is in its receiving mode and the channel is busy, and
= 2 when the station is in its transmitting mode.

Internal Registers:
P: contains the value of the input signal IN at the previous clock pulse,
E: contains the number of elapsed clock pulses since the last TS update,
U: contains the length (in clock pulses) of the observation time interval,
NI: contains the number of channel idle periods completed in the last E time units, SI: contains the sum of the lengths (in clock pulses) of the NI last idle periods,
CI: contains the length (in clock pulses) of the current idle period,
$\delta$: contains the idle period correction (in clock pulses).

System Parameters:
$G_o{}^c$: contains the nominal sensing rate per clock pulse,
$U_l$: contains the lower bound on U,
$TS_l$: contains the lower bound on TS,
$TS_u$: contains the upper bound on TS.

Channel Parameters:
A: is the length (in clock pulses) of the receive to transmit switching time (A>1),
LA: is the length (in clock pulses) of a packet transmission time (LA/A>1),
M: is the maximum backlog size.

At start-up or when the channel parameters are reset the control parameter and the internal registers are given the following initial values:
$TS = M/G_o{}^c$
$P = 1$
$E = 0$
$U = 2 \times U_l$
$NI = 0$
$CI = 0$
$\delta = A/2$ FIG. 4 illustrates a channel controller device 32 in block schematic form. The channel controller device 32 comprises a time counter 34, an estimation device 36 and an update device 38, the operation of each of which is described in greater detail with reference to FIGS. 5, 6 and 7, respectively.

The channel controller device 32 is located at each transmitter/receiver station. The device 32 is triggered by a clock signal applied to an input 40. The clock signal has a period which is substantially smaller than the receive to transmit time a. The smaller the clock period, the more accurate the control will be. The device 32 consists of an input (not shown in FIG. 4) for the signal IN and an arithmetic logic unit (ALU) processor with seven internal registers for P, E, U, NI, SI, CI and $\delta$, respectively, and a memory capable of storing the values of the four system parameters $G_o{}^c$, $U_l$, $TS_l$ and $TS_u$ and the three channel parameters A, LA and M. In operation the device 32 computes the value of the control parameter TS which is used by the transmitting equipment at the station.

In the time counter 34 shown in FIG. 5 the clock pulses which have elapsed since the last update of TS are counted.

The estimation device 36 (FIG. 6) updates the two variables SI and NI which respectively contain the current sum of the lengths (observed or approximated) of the idle periods presented by the channel since the last update of TS and the number of the idle periods. These updates are based on the previous value of P and the current value of IN.

The operation of the estimation device 36 is as follows. In a first stage 42 a check is made as to whether P=0 or 1 and IN=0, if the answer is affirmative (Y) then in a stage 44 the value of CI is incremented by 1. Alternatively if the answer to the check made in the stage 42 is negative (N) then a second check is made in a stage 46 as to whether P=2 and IN=0, if the answer is Y then CI=$\delta$+1 (stage 48). In the event of a negative answer (N) then in a stage 50 a third check is made as to whether P=0 and IN=1. An answer Y causes the previous NI to be incremented by 1 to form a new NI, the previous SI to be incremented the value of CI to form a new SI and for the CI register to be reset to zero. These operations take place in a stage 52. An answer N from the stage 50 causes a fourth check to be made in a stage 54, namely, whether P=0 and IN=2. An affirmative answer (Y) causes the previous value of NI to be incremented by one, the previous SI to be incremented by the sum of CI and the correction $\delta$ and for CI to be made zero in a stage 56. Outputs of the stages 44, 48, 52 and 56 and the N output from the stage 54 are applied to an operational stage 58 in which P is made equal to IN.

The update device 38 (FIG. 7) is activated at the end of each observation interval (U) to update the output variable TS in accordance with equations (1) and (2). After each update, this device 38 recomputes the length of the next observation interval and the idle period correction $\delta$ and finally resets to zero the time counter E and the measure variables SI and NI.

Figure 7:
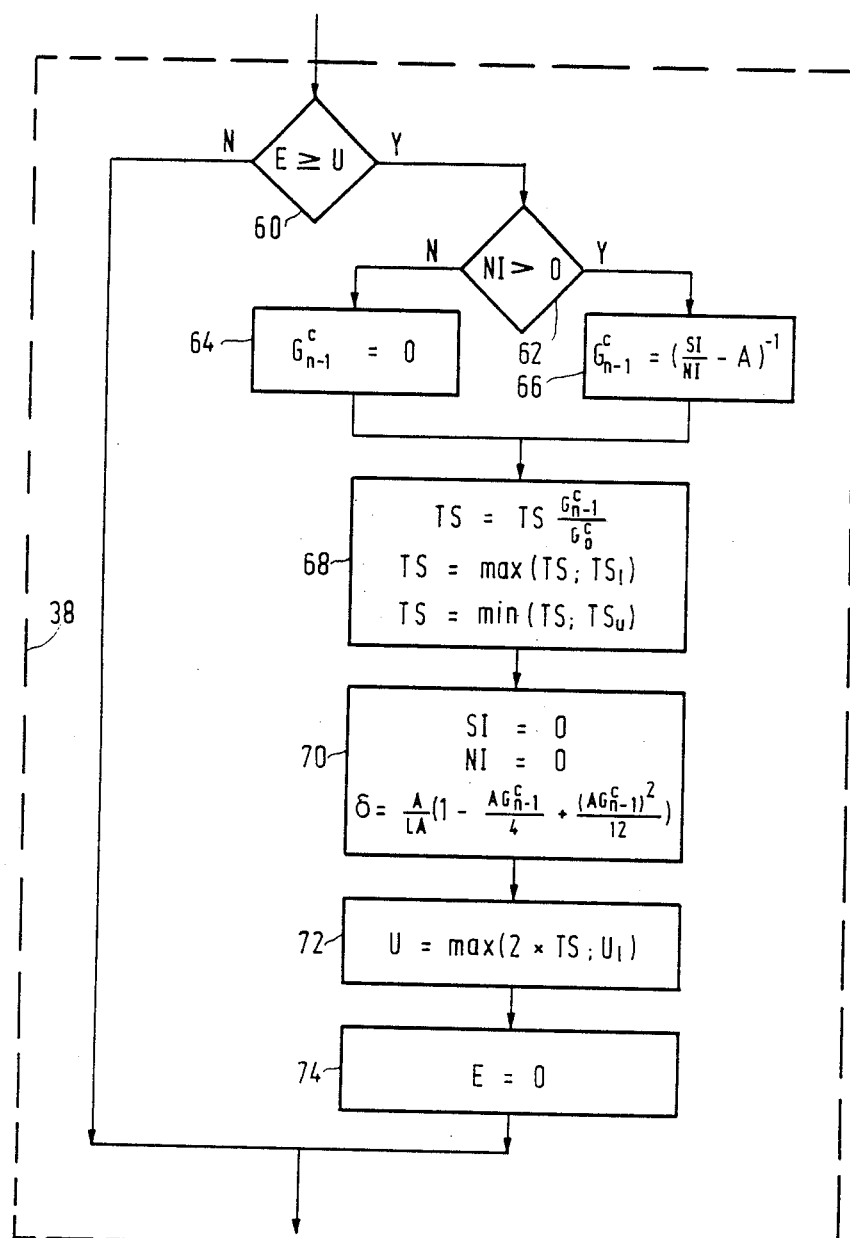

In order to facilitate the understanding of the operation of the update device illustrated in FIG. 7, the description of the four system parameters and the internal registers will be amplified.

Firstly the system parameter $G_o^c$, the dynamic update of the control variable TS aims at maintaining the expected sensing rate to a nominal value $G_o$. The value chosen here for $G_o$ is the value that maximizes the expected channel throughputs.

For a given value of the vulnerability period the relation between S and the expected sensing rate is given by equation (26). If this equation (26) is differentiated with respect to G and the derivative is set to zero, one finds that S is maximized for a value of G which satisfies $$e^{-aG} = a(1+2a)G^2. \qquad (34)$$

Approximating the exponential by the three first terms of its Taylor's expansion, one obtains $$G_o = \frac{-a + \sqrt{7a^2 + 4a}}{2a + 3a^2}. \qquad (35)$$

as an accurate estimate of the nominal expected sensing rate per packet transmission time. Using the clock period as time unit, one gets $$G_o^c = \frac{\sqrt{7 + 4\frac{LA}{A}} - 1}{2LA + 3A} \qquad (36)$$

Secondly, the system parameters $TS_l$ and $TS_u$, as the average time between two consecutive sensings of the carrier by a station is equal to TS/2, the contribution by this station to the expected total sensing rate is 2/TS. The value of the scheduling time interval $TS_l$ which maximizes the expected channel throughput when there are only two users competing for the channel, is therefore given by $$\frac{2}{TS_l} = \frac{G_o^c}{2}, \qquad (37)$$

and, $$TS_l = \frac{4}{G_o^c}. \qquad (38)$$

Similarly, if M is an estimate of the maximal backlog size in the system, the value $TS_u$ of the scheduling time interval which maximises the throughput when all the stations compete for the access of the channel is given by $$\frac{2}{TS_u} = \frac{G_o^c}{M}, \qquad (39)$$

and, $$TS_u = \frac{2M}{G_o^c}. \qquad (40)$$

Finally, the system parameter $U_l$, by using equation (29) $n_m(a)$ is chosen as the minimal number of idle periods whose observation guarantees with 99 percent probability that a throughput of at least ninety percent of the maximum possible throughput will be achieved during the next period. In this equation, the parameters $\alpha_1(a)$ and $\alpha_2(a)$ which define the ninety percent throughput interval depend on the vulnerability period a. The value of $U_l$ is then given, in clock pulses, by $$U_l = n_m(a)\left(1 + 2a + \frac{1}{G_o(a)}\right) \times LA. \qquad (35)$$

When a station is switched on, its internal registers and the control variable must be assigned with the values given above. These initial values are then updated by the time counter 34, the estimation device 36 and the update device 38 according to their definition. The expression used for the internal register $\delta$ in the estimation device requires some estimating explanation.

According to equation (18), when a station decides to transmit, the length (in packet transmission time) of the current idle period $I_m$ should be enlarged by $$\delta = \frac{a + \frac{1}{G}(1 - e^{-aG})}{2}, \qquad (42)$$

where G is the expected sensing rate (in packet transmission time), and a is the receive to transmit switching time. Similarly, when a station returns after a transmission to the receiving mode, the length of the idle period $I_{m+1}$ has to be initialized with the same quantity (see 19).

The equation (42) can be approximated by $$\delta = a\left(1 - \frac{aG}{4} + \frac{a^2G^2}{12}\right). \qquad (43)$$

Given that LA is the packet transmission time and that the expected sensing rate per clock pulse $G^c$ is equal to G/LA, then $$\delta = \frac{A}{LA}\left(1 - \frac{AG^2}{4} + \frac{(AG)^2}{12}\right). \qquad (44)$$

Since the current value of $G^c$ is unknown then the estimate $G_{n-1}^c$ obtained at the previous update of TS will be used to derive the current value of $\delta$.

Reverting to FIG. 7, the update process commences at a stage 60 in which a check is made to see if the number of elapsed clock pulses since the last TS update, E, is greater or equal to the length in clock pulses of the observation interval U. An answer N indicates that the current controller has not implemented an update and that the estimation process (FIG. 6) is to continue. An answer Y indicates that the value of TS has to be updated subject to the number of channel idle periods NI being greater than zero, in other words the channel has not been totally silent. This second check is carried out in a stage 62. An answer N means that $G_{n-1}^c = 0$, stage 64, which means that TS cannot be updated in accordance with equation (1). However an answer Y means that in a stage 66

$$G_{n-1}^c = \left(\frac{SI}{NI} - A\right)^{-1}.$$

In a stage 68, an updated value of TS is computed and it is checked to ensure whether it lies at the maximum or minimum limits for TS. In a stage 70, SI and NI are made equal to 0 and a new idle period correction $\delta$ is calculated on the basis of $$\delta = \frac{A}{LA}\left(1 - \frac{AG_{n-1}^c}{4} + \frac{(AG_{n-1}^c)^2}{12}\right). \quad (45)$$

This in turn leads to a modification of U, stage 72, to take into account the new value of TS, namely $$U = \max(2 \times TS; U_l)$$

The update operation ends with stage 74 in which E=0 so that a new observation interval commences.

From reading the present disclosure, other modifications will be apparent to persons skilled in the art. Such modifications may involve other features, which are already known in the design, manufacture and use of packet switching systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicity or implicity or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the patent application or of any further application derived therefrom.

What is claimed is:

1. A controlled carrier sense multiple access (CSMA) packet switching system comprising at least two stations each of the stations comprising sensing means for sensing if a communications channel is busy; channel control means for determining: $TS_u$=the scheduling time interval that maximises the expected throughput when all the stations compete for the channel access, $TS_l$=the scheduling time interval that maximises the expected throughput when two stations compete for the channel access, $TS_{n-l}$=the scheduling time interval determined in a preceding (n−1)th observation interval, $G_{n-l}$=the average offered load in the (n−1)th observation interval, and $G_o$=the nominal average offered load;

the channel control means including scheduling means responsive to the sensing means for scheduling a new sensing point at random in a dynamically determined time interval $$TS_n = \min\left(TS_u, \max\left(TS_l, TS_{n-1} \cdot \frac{G_{n-1}}{G_o}\right)\right)$$

when the channel is sensed busy.

2. A system as claimed in claim 1 comprising estimating means for estimating E=the average idle period and wherein $$G_{n-l} = (E[l(I)] - a)^{-1}$$

where a=the switching time of a station.

3. A system as claimed in claim 2, wherein the average idle period length $$\overline{E[l(I)]} = SI/NI$$

where SI=the current sum of the lengths of the idle periods and NI=the number of idle periods.

4. A system as claimed in claim 3 wherein the estimating means comprises means for estimating the average idle period in the event of the station participating in a busy period which cannot detect the end of the preceding idle period and the beginning of the following idle period.

5. A system as claimed in claim 4, wherein said estimating means comprises means for discarding from its current estimation the idle periods which border the busy period in which its station is transmitting and for basing its estimation on only fully observed periods.

6. A system as claimed in claim 4, wherein said estimating means comprises means for integrating into its estimation an approximation of the combined length in the time domain of the idle periods immediately preceding and following the busy period in which the station transmits, said approximation being based on determining $t^b(I_m)$=the beginning of the preceding idle period and $t^e(I_{m+l})$=the end of the next following idle period and upper bounding the length of the intervening busy period by $(l+a)$ where a=the switching time and subtracting $t^b(I_m)$ and $(l+a)$ from $t^e(I_{m+l})$.

7. A system as claimed in claim 4, wherein the estimating means comprises means for integrating into its estimation an approximation of the combined length in the time domain of the idle periods immediately preceding and following the busy period in which the station transmits, said approximation being based on determining $(T^b(I_m))$=the beginning of the preceding idle period and $(T^e(I_{m+1}))$=the end of the next following idle period and estimating $E[l(B)_m]$=the length of the intervening busy period in which the station transmits and subtracting $t^b(I_m)$ and $E[l(B)_m]$ from $t^e(I_{m+1})$.

8. A system as claimed in claim 4, wherein the estimating means comprises means for integrating into its estimation an approximation of the length of the preceding idle period by estimating the end of the preceding idle period and subtracting the time of occurrence of the preceding idle period, and an approximation of the length of the immediately following idle period by subtracting an estimation of the beginning of the immediately following idle period from the time of occurrence of the end of the following time period.

9. A system as claimed in claim 8, wherein the estimating means comprises means for estimating the delay $$\delta = \frac{a + G(1 - e^{-aG})}{2}$$

between the end of the preceding idle period and $t_2$ = the time when the station having a packet for transmission found the channel idle; where a = the receive to transmit switching time of the station and G = the load offered to the channel.

10. A system as claimed in claim 9, wherein the estimating means comprises means for estimating the beginning of the next following idle period as being $t_2 + l + 2a - \delta$ where l = the transmission time of an information packet.

11. A system as claimed in claim 8, comprising means for dynamically determining the observation period $$U = max(2TS, U_1)$$

where TS = the current control variable, $U_1$ is the minimum time needed to obtain a confident estimation of G, and $$U_1 = n_m(a)\left(1 + 2a + \frac{1}{G_o(a)}\right)$$

where $n_m$ = the minimum number of idle periods to be observed to obtain a confident estimation of G.

12. A method of operating a controlled CSMA packet switching system of a non-persistent type, the system comprising at least two stations operating on at least one communication channel, comprising sensing that at least one channel is busy, and scheduling a new sensing point at random in a dynamically determined time interval $TS_n$ where $$TS_n = min\left(TS_u, max\left(TS_1, TS_{n-1} \cdot \frac{G_{n-1}}{G_o}\right)\right)$$

where $TS_u$ is the scheduling time interval that maximises the expected throughput when all the stations compete for the channel access, $TS_1$ is the scheduling time interval that maximises the expected throughput when two stations compete for the channel access, $TS_{n-1}$ is a scheduling time interval determined in a preceding (n−1)th observation interval, $G_{n-1}$ is the average offered load in the (n−1)th observation interval, and $G_c$ is a nominal average offered load.

13. A method as claimed in claim 12, comprising dynamically updating the time interval $TS_n$ to maximise the expected channel throughput.

14. A method as claimed in claim 12, wherein the dynamic updating of the time interval $TS_n$ comprises estimating $G_{n-1}$ on the basis of an estimation of the average idle period length $\overline{E[l(I)]}$ during the observation interval, where $G_{n-1} = (\overline{E[l(I)]} - a)^{-1}$ where a is the switching time of a station.

15. A method as claimed in claim 14, wherein the estimating step comprises estimating the average idle period $\overline{E[l(I)]} = SI/NI$, where SI is the current sum of the lengths of the idle periods and NI is the number of idle periods contributing to the current sum.

16. A method as claimed in claim 14 wherein the estimating step comprises estimating the average idle period length based on fully observed periods only.

17. A method as claimed in claim 14 comprising, in the event of a station participating in a transmission on the or one of the channels and being unable to detect the end of an immediately preceding idle period and the beginning of the next following idle period, the step of approximating the combined length in the time domain of the immediately preceding and next following idle periods and including the approximation in the estimation of E[l(I)], said approximating step comprising determining the commencement ($t^b(I_m)$) of the preceding idle period and the termination $t^e(I_{m+1})$ of the next following idle period and upper bounding the length of the intervening busy period by (1+a) and subtracting $t^b(I_m)$ and (1+a) from $t^e(I_{m+1})$.

18. A method as claimed in claim 14 comprising, in the event of a station participating in a transmission on at least one of the at least one channel and being unable to detect the end of an immediately preceding idle period and the beginning of the next following idle period, approximating the combined length in the time domain of the immediately preceding and next following idle period and including the approximation in the estimation of $\overline{E[l(I)]}$, and wherein the approximating step comprises determining the commencement ($t^b(I_m)$) of the immediately preceding idle period and the termination ($t^e(I_{m+1})$) of the next following idle period and estimating the length of the intervening busy period $E[l(B_m)]$ during which the station transmits and subtracting $t^b(I_m)$ and $E[l(B_m)]$ from $t^e(I_{m+1})$.

19. A method as claimed in claim 14 comprising, in the event of a station participating in a transmission on at least one of the at least one channel and being unable to detect the end of the immediately preceding idle period and the beginning of the next following idle period approximating the lengths of said preceding and following idle periods and the estimating step comprises including the approximations in the estimation of E[l(I)], wherein the approximation of the immediately preceding idle period is made by subtracting the time of commencement of said idle period from an estimation of the end of said idle period and the approximation of the next following idle period is made by subtracting an estimation of the time of commencement of said idle period from the time of termination of said idle period.

20. A method as claimed in claim 19, comprising estimating the delay $$\delta = \frac{a + G(1 - 2^{-aG})}{2}$$

between the end of the preceding idle period and the instant ($t_2$) when the station having a packet for transmission found the channel idle where a is the receive to transmit switching time of the station and G is the load offered to the channel.

21. A system as claimed in claim 20, comprising estimating the beginning of the next following idle period as $$t_2 + l + 2a - \delta.$$

where l is the transmission time of an information packet.

22. A method as claimed in claim 19, comprising dynamically determining the observation period (U) on the basis of $$U = max(2TS, U_1)$$

where TS is the current control variable, $U_1$ is the minimum time needed to obtain a confident estimation of G, and $$U_1 = n_m(a)\left(1 + 2a + \frac{1}{G_o(a)}\right)$$

where $n_m$ is the minimum number of idle periods to be observed to obtain a confident estimation of G.

23. A station for use in a non-persistent controlled CSMA packet switching system, comprising a receiver, a transmitter, switching means to switch either the receiver or the transmitter to a communications channel, sensing means connected to the switching means to sense the busy/idle state of the communication channel and to actuate the switching means to switch from the receiver to the transmitter in the event of the station having an information packet ready for transmission and the channel being sensed idle, information packet ready for transmission and the channel is sensed busy, a new sensing point is scheduled at random in a dynamically determined time interval $TS_n$ where $TS_n = min(TS_u, max(TS_1, TS_{n-1} \cdot G_{n-1}/G_o))$ channel control means for determining $TS_u$ = the scheduling time interval that maximises the expected throughput when all the stations complete for the channel access, $TS_1$ = a scheduling time interval determined in a preceding (n−1)th observation interval, $G_{n-1}$ = the average offered load in the (n−1)th observation interval, and $G_o$ = a nominal average offered load, the channel control means including scheduling means responsive to the sensing means for scheduling a new sensing point at random in a dynamically determined time interval $$TS_n = min\left(TS_u, max\left(TS_1, TS_{n-1} \cdot \frac{G_{n-1}}{G_o}\right)\right)$$

when the channel is sensed busy.

24. A station as claimed in claim 23 comprising estimating means for estimating $G_{n-1} = (\overline{E[I(I)]} - a)^{-1}$ where $\overline{E[I(I)]}$ is the estimator of the average idle period and a is the switching time of a station.

25. A station as claimed in claim 24, wherein said estimating means comprises averaging means for averaging the lengths of the idle periods occurring during an observation period, and the estimator of average idle period $\overline{E[I(I)]} = SN/NI$ where SI is the current sum of the lengths of the idle periods and NI is the number of idle periods.

26. A station as claimed in claim 24 in which the estimating means comprises means for estimating the average idle period in the event of the station participating in a busy period and cannot detect the end of the preceding idle period and the beginning of the following idle period.

27. A station as claimed in claim 26, wherein said estimating means bases its estimation on only fully observed periods.

28. A station as claimed in claim 26, wherein said estimating means comprises means for integrating an approximation of the combined length in the time domain of the idle periods immediately preceding and following the busy period in which the station transmits into the estimation, said approximation being based on determining the commencement ($t^b(I_m)$) of the preceding idle period and the termination ($t^e(I_{m+1})$) of the next following idle period and upper bounding the length of the intervening busy period by (1+a) and subtracting $t^b(I_m)$ and (1+a) from $t^e(I_{m+1})$.

29. A station as claimed in claim 26, wherein said estimating means comprises means for integrating an approximation of the combined length in the time domain of the idle periods immediately preceding and following the busy period in which the station transmits into its estimation, said approximation being based on determining the commencement ($t^b(I_m)$) of the preceding idle period and the termination ($t^e(I_{m+1})$) of the next following idle period and estimating the length of the intervening busy period $E[l(B)_m]$ in which the station transmits and subtracting $t^b(I_m)$ and $E[l(B)_m]$ from $t^e(I_{m+1})$.

30. A station as claimed in claim 26, wherein said estimating means comprises means for integrating an approximation of the length of the preceding idle period by estimating the end of the preceding idle period and substracting the time of occurrence of the preceding idle period, and an approximation of the length of the immediately following idle period by subtracting an estimation of the beginning of the immediately following idle period from the time of occurrence of the end of the following time period into its estimation.

31. A station as claimed in claim 30, wherein the estimating means comprises means for estimating the delay $$\delta = \frac{a + G(1 - 2^{aG})}{2}$$

between the ends of the preceding idle period and $t_2$ = the time when the station having a packet for transmission found the channel idle; where a = the receive to transmit switching time of the station and G = the load offered to the channel.

32. A station as claimed in claim 31, wherein the estimating means comprises means for estimating the beginning of the next following idle period as being $$t_2 + l + 2a - \delta$$

where l = the transmission time of an information packet.

33. A station as claimed in claim 30, 31 or 32, comprising means for dynamically determining the observation period dynamically on the basis of $$U = max(2TS, U_1)$$

where TS = the current control variable, and $$U_1 = n_m(a)\left(1 + 2a + \frac{1}{G_o(a)}\right),$$

the minimum time needed to obtain a confident estimation of G, where $n_m$=the minimum number of idle periods to be observed to obtain a confident estimation of G.

34. A controlled carrier sense multiple access (CSMA) packet switching system comprising at least two stations each of the stations comprising sensing means for sensing of a communications channel is busy; channel control means for determining:

$TS_u$ = the scheduling time interval that maximises the expected throughput when all the stations compete for the channel access, $TS_1$ = the scheduling time interval that maximises the expected throughput when two stations compete for the channel access, $TS_{n-1}$ = the scheduling time interval determined in a preceding (n−1)th observation interval, $G_{n-1}$ = the average offered load in the (n−1)th observation interval, $G_o$ = the nominal average offered load; and $a$ = a smoothing factor the channel control means including scheduling means responsive to the sensing means for scheduling a new sensing point at random in a dynamically determined time interval $$TS_n = \min\left(TS_u, \max\left(TS_1, (1-a) \times TS_{n-1} + a \times TS_{n-1}\frac{G_{n-1}}{G_o}\right)\right)$$

when the channel is sensed busy.

35. A station for use in a non-persistent controlled CSMA packet switching system, comprising a receiver, a transmitter, switching means to switch either the receiver or the transmitter to a communications channel, sensing means connected to the switching means to sense the busy/idle state of the communication channel and to actuate the switching means to switch from the receiver to the transmitter in the event of the station having an information packet ready for transmission and the channel being sensed idle, channel control means for determining $TS_u$ = the scheduling time interval that maximises the expected throughput when all the stations compete for the channel access, $TS_1$ = a scheduling time interval determined in a preceding (n−1)th observation interval, $G_{n-1}$ = the average offered load in the (n−1)th observation interval, $G_o$ = a nominal average offered load, and $a$ = a smoothing factor;

the channel control means including scheduling means responsive to the sensing means for scheduling a new sensing point at random in a dynamically determined time interval $$TS_n = \min\left(TS_u, \max\left(TS_1, (1-a) \times TS_{n-1} + a \times TS_{n-1}\frac{G_{n-1}}{G_o}\right)\right)$$

when the channel is sensed busy.

* * * * *